June 29, 1943.   A. B. HEMSTREET   2,322,782
SERVO SYSTEM FOR AIRCRAFT
Filed Jan. 13, 1942
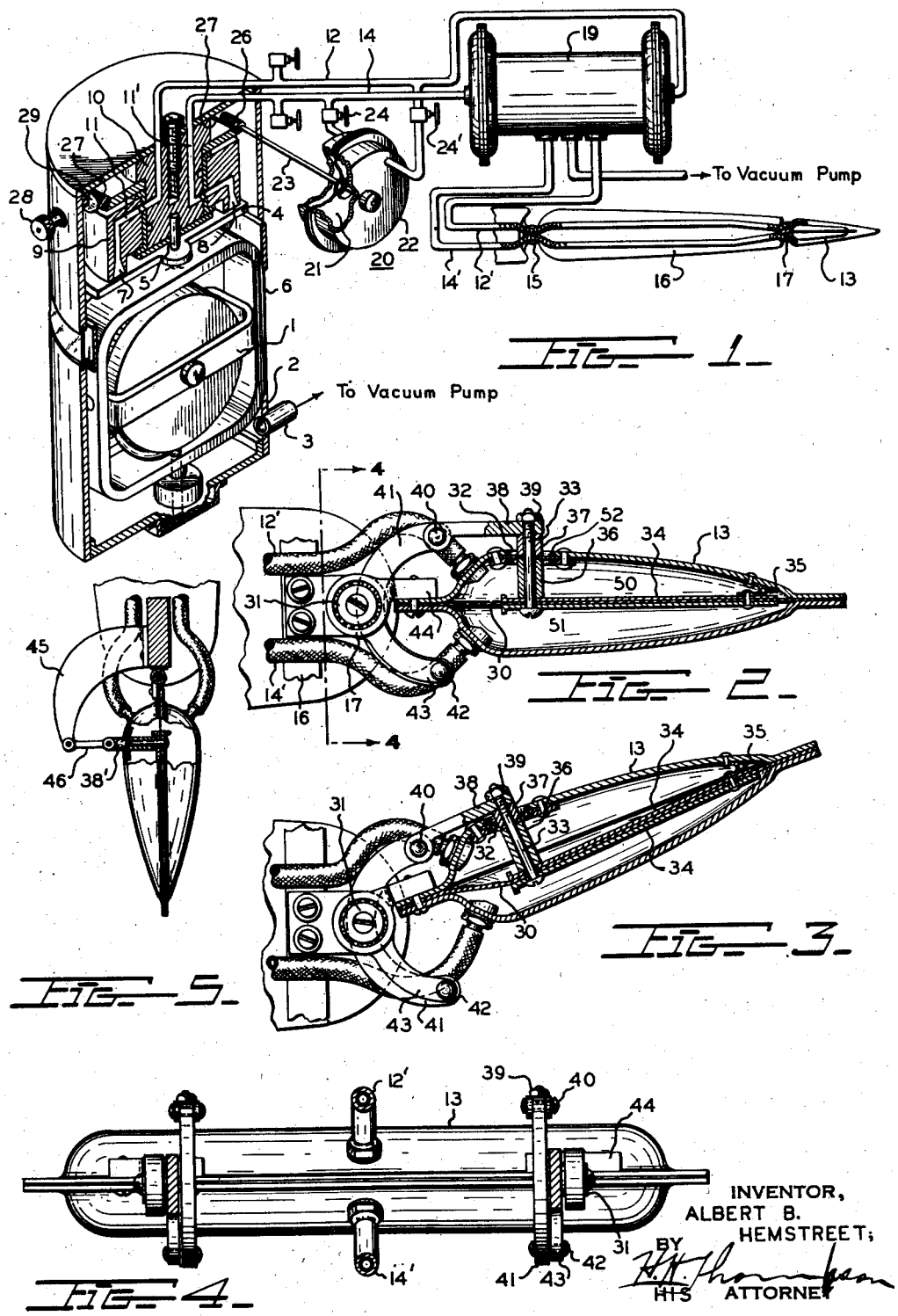
INVENTOR,
ALBERT B. HEMSTREET;
BY
HIS ATTORNEY Patented June 29, 1943

2,322,782

UNITED STATES PATENT OFFICE 2,322,782

SERVO SYSTEM FOR AIRCRAFT

Albert B. Hemstreet, Flushing, N. Y., assignor to Sperry Gyroscope Company, Inc., Brooklyn, N. Y., a corporation of New York Application January 13, 1942, Serial No. 426,651

5 Claims. (Cl. 244—78)

This invention relates to the control, through a servo system, of airplane control surfaces such as the rudder, ailerons or elevators. Such servo systems are now commonly employed in connection with automatic pilots for aircraft and are also used in large ships to assist the human pilot. A large part of the weight of such prior systems has been in the servomotor itself which is usually mounted on the aircraft structure and connected to the controlling surface through suitable wires or levers. To reduce the size, weight and expense of such servomotors, I propose to employ Flettner tabs on such surfaces so that a small, light servomotor may be employed, and to further simplify and lighten such servo system by building into the trim tab itself a pressure responsive device which moves the tab on slight differences in air pressure supplied within the tab from the automatic pilot or a manually operative valve on the airplane. Thus separate servomotors are virtually eliminated. With such a device I find it possible to operate the tab directly or indirectly from the weak pick-off signals received from an automatic pilot for aircraft, although I may provide air relays or boosters between the automatic pilot and the servomotor, especially where long air lines are necessary.

Referring to the drawing illustrating the preferred form of my invention,

Fig. 1 shows a diagrammatic view of the direction gyro element of an automatic pilot connected to operate the trim tab of the rudder, the former being shown in perspective view, partly in vertical section.

Fig. 2 shows a vertical section through the trim tab, showing the improved built-in servo system.

Fig. 3 is a view similar to Fig. 2, showing the resulting movement of the trim tab when superior air pressure is supplied to the upper compartment.

Fig. 4 is a front elevation of a trim tab, the section being taken on line 4—4 of Fig. 2.

Fig. 5 is a plan view, partly in section, of a modified form of the invention.

While my servo system may be operated from a manually operated controller, I have shown it operated from a standard form of automatic pilot in which the signals are in the form of differential air pressure. Fig. 1 shows only the directional gyro element of such pilot, the directional gyro proper being shown at 1, enclosed within a casing 2 from which air is exhausted through pipe 3 connected to a suitable vacuum pump (not shown). The differential air pressure signals are created by a cut-off disc 4 secured to the vertical shaft 5 connected to the vertical ring 6 of the directional gyroscope. Said cut-off disc cooperates with ports 7 and 8 in a member 9 rotatably mounted above the gyroscope on a central stem 10. The port 7 is connected through an annular chanel 11 to a pipe 12 leading toward the trim tab 13, while the port 8 is connected through an annular channel 11' in central stem 10 to the other pipe 14. The continuations 12' and 14' of said pipes are shown as made of flexible material adjacent the hinged point 15 of the main control surface 16 and also adjacent the hinged point 17 of the trim tab 13.

It will be understood that if necessary, one or more suitable relay or booster valves, indicated diagrammatically at 19, may be employed between the gyroscope and trim tab, especially if the pipe lines are long, to avoid too great a pressure drop in the lines. It is also understood that I may employ, if desired, a suitable anti-hunt device 20 or devices as known in the prior art, such as shown in the patent to Kenyon and Zand No. 2,210,916, dated August 13, 1940, for Automatic pilots for dirigible craft. According to this system, the diaphragm or piston 21 within the cylinder or container 22 is connected through a piston rod 23 to rotate the pick-off housing 9 a slight amount in either direction, the two ends of the cylinder being connected, respectively, through restricted valves 24, 24' to the pipes 12 and 14. The connection to the valve housing in this instance is shown in the form of a reversible worm gear 26 on a stem 23 which meshes with teeth 27 on a gear secured to the valve housing 9. The course change knob is shown at 28, which has on the shaft thereof a bevel gear 29 normally out of mesh with gear 27.

As heretofore stated, I prefer to incorporate my servomotor within the trim tab 13 itself, which is pivoted to the main rudder structure 16 through an anti-friction bearing 31. As shown in Figs. 2 and 3, I secure across the middle of the interior of the trim tab a flexible diaphragm 30 and connect the extensions from pipes 12' and 14' to the interior of the tab on each side of the diaphragm, around which re-enforcing plates 34 may be placed, the plates being riveted together and hinged at one end of hinge 35 to the tab structure. A hole is cut through the tab at one side, as at 32, and there extends through this hole the bent end of a lever 38, which end is shown in the form of a bolt 33, the head of which is shown as extending through the diaphragm 30 and its re-enforcing plates 34, which separate the interior of the tab into two chambers 50 and

51. Around the bolt I show two sleeves 36 and 37 which clamp between them the middle portion of the flexible sealing closure 52 around the hole. The diaphragm 30 and plates 34 are clamped between the bolt head and lower sleeve 36. The outer end of the bolt is shown as extending through the other portion of lever 38, the nut 39 of the bolt being clamped tightly on the same so that the lever 38, bolt and sleeves form a bell-crank structure, the outer end of which is rigidly clamped to plates 34 of the hinged stiffened diaphragm. The bell-crank lever 38 is hinged at 40 to an intermediate arc-shaped arm or lever 41 which, in turn, is hinged at 42 to an arm 43 fixed to a bracket 44 extending from the main rudder structure 16, said bracket also supporting the pivot bearing 17.

It will be understood that the pressure within the pipes 12' and 14' is normally balanced, in which case the trim tab on the rudder remains aligned with the main rudder because the air streams on the exterior sides are equal. In case, however, the pressure supplied by pipe 12' exceeds that supplied by pipe 14', the trim tab will be rotated counter-clockwise, as indicated in Fig. 3, because the mean effective pressure on the under surface of the upper wall of the tab exceeds that transmitted by the dividing diaphragm to the tab due to the fact that a portion of the pressure on the latter is absorbed by the bell-crank structure. In other words, analysis will show that a portion of the downward pressure on the diaphragm is resisted by the bell-crank lever 38, this pressure being effective at hinge 40 to tend to move lever 41 about its fixed axis 42. This results in actual movement of the tab 13 to the position in which it is shown in Fig. 3.

For similar reasons, if the superior pressure is supplied by the pipe 14', the tab will rotate clockwise. It will be obvious that the tab will move until the counter pressure of the air stream balances the unbalanced pressure within the tab, so that movement of the tab is obtained in proportion to the signal strength, which is in turn proportional to the deviation through a limited angle.

Fig. 5 illustrates a simplified or modified form of the invention in which the bolt structure 38' secured to the diaphragm is hinged to the fixed arm 45 on the structure of the main rudder through a link 46. The same action will be secured in this case since the pressure on half of the trim tab will be partially borne by the bolt, so that the trim tab will be rotated as before.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. A hinged hollow control surface for airplanes and the like, comprising a support to which said surface is hinged and having within said surface means for dividing the interior into two chambers, a linkage connected to said dividing means and exteriorly hinged to said support, and means for supplying differential air pressure within each chamber.

2. A system for controlling hinged control surfaces on large aircraft, comprising an auxiliary tab hinged to the control surface, said auxiliary tab being hollow, a diaphragm within said tab dividing it into two chambers, a link connecting said diaphragm to a point on said main control surface, and means for supplying differential air pressure within each chamber.

3. In an automatic pilot for aircraft, the combination with a position maintaining device, a differential pressure pick-off thereat giving differential pressure signals proportional to displacement, a main control surface to be controlled from said device, a tab hinged to said surface, a displaceable diaphragm built within said tab, means operated by displacement thereof for turning said tab, and means connecting said pick-off and the interior of said tab for displacing said diaphragm.

4. A control surface as claimed in claim 1, in which said linkage comprises a bell-crank lever connected to said dividing means at one end, and a second lever hinged at one end to the fixed support and at its other end to said bell-crank lever.

5. In an automatic pilot for aircraft, the combination with a position maintaining device, a differential pressure pick-off thereat giving primary differential pressure signals proportional to displacement, an anti-hunt device actuated from said signals for giving a corrective displacement to said pick-off, a main control surface to be controlled from said first mentioned device, a tab hinged to said surface, a displaceable diaphragm built within said tab, means operated by displacement thereof for turning said tab, and means connecting said pick-off and the interior of said tab for displacing said diaphragm, whereby said tab is moved in proportion to said signals and hunting is prevented.

ALBERT B. HEMSTREET.